Jan. 10, 1961    C. J. FORD ET AL    2,967,415
ELECTRICAL HEATING ELEMENT
Filed June 13, 1957

INVENTOR.
CHARLES J. FORD
JOHN L. NISBET
BY
*R. L. Miller*
ATTORNEY

United States Patent Office 2,967,415
Patented Jan. 10, 1961

2,967,415

ELECTRICAL HEATING ELEMENT

Charles J. Ford, Canton, Ohio, and John L. Nisbet, Winston-Salem, N.C., assignors to The Goodyear Tire & Rubber Company, Akron, Ohio, a corporation of Ohio Filed June 13, 1957, Ser. No. 665,545

10 Claims. (Cl. 66—193)

This invention relates to electric resistance heating elements and, more particularly, to flexible heating elements which may be conformed easily to contoured or non-planar surfaces without distorting the resistance pattern of the heating element.

There is a great demand for flexible electrical heating elements and particularly for aircraft de-icing applications. With the rapid changes in the design of aircraft and the more exacting flying conditions to which they are subjected, it is essential that adequate anti-icing protection on the various surfaces of the aircraft be provided. The surfaces have become more and more complicated in contour and, consequently, a very difficult problem is encountered in providing satisfactory de-icing structures. The large volume requirements necessitate simplified production procedures and, resultingly, it is highly desirable to build such elements in the flat position to eliminate complicated molding or shaping devices. This method also permits a wide range of adaptability of the elements to different structural surfaces without requiring substantial changes in the manufacturing processes.

There have been many types of de-icing structures proposed but with the severe temperature conditions to which aircraft are now subjected, the most satisfactory de-icing structure includes resistance wire heating elements because of the electrical stability. The fabrication of such structures permits a very closely controlled resistance and the resulting controlled heat output, but with the complicated contours that are now presented, it is essential that the de-icer construction be sufficiently flexible to permit the installation of the de-icer on the contoured surfaces without disturbing the effectiveness of the heating element. In order to permit the de-icer to conform to the contour, the wire resistance elements in the heating element of the de-icer must be sufficiently flexible so as to be distorted without destroying the resistance pattern or some of the resistance wires themselves due to buckling or breaking.

In order to eliminate or minimize buckling or breaking of the wires during installation over a contoured surface, the wires may be built into the structure in a sinuous form to absorb relatively great amounts of compressing or tensioning without wrinkling or breaking. It is, therefore, an object of this invention to provide a wire resistance heating element construction which may be fabricated in the flat but installed on contoured or non-planer surfaces without materially affecting the heating element.

Another object of the invention is to provide a simple and relatively inexpensive method of construction of a flexible resistance heating element.

A further object of the invention is to provide a heating element with the individual wires forming the heating element extending sinuously and substantially parallel through the structure.

A still further object of the invention is to provide a material which is readily adaptable to a wide variety of sizes and shapes of heating elements.

Another object of the invention is to provide a type of structure which may be readily manufactured to meet a wide range of electrical characteristics.

Other objects of this invention will appear hereinafter as the description thereof proceeds, the novel arrangements, features and combination being clearly set forth in the description and in the appended claims.

It is well known that knitted fabric generally is not only very flexible but also readily extensible in all directions. By incorporating during the knitting operation resistance wires extending substantially parallel in the warp direction through the knitted fabric and held in position by the knitted structure, a satisfactory and durable heating element is provided but in some instances, it is not sufficiently flexible for the desired use. The wires are subsequently joined in the desired combination of circuit or circuits to form the resistance wire heating element or grid.

To provide additional flexibility, it is preferable to have the wires extend sinuously and parallel through the fabric to absorb the compression or tension introduced during installation on the contoured surfaces. By moving each wire at predetermined intervals to different wales of the knitted fabric as the wire progresses through the fabric, each wire will assume a sinuous path. The degree of flexibility may be controlled by selection of the knitting pattern. The wire in this structure is not permanently formed or shaped in this sinuous shape, but is resiliently held in position by the knitted construction of the fabric. This sinuosity in the wires imparts substantial flexibility to the heating element for application to a contoured surface as the fabric may be compressed, stretched or distorted without buckling, wrinkling or stretching the wires.

Figure 1:
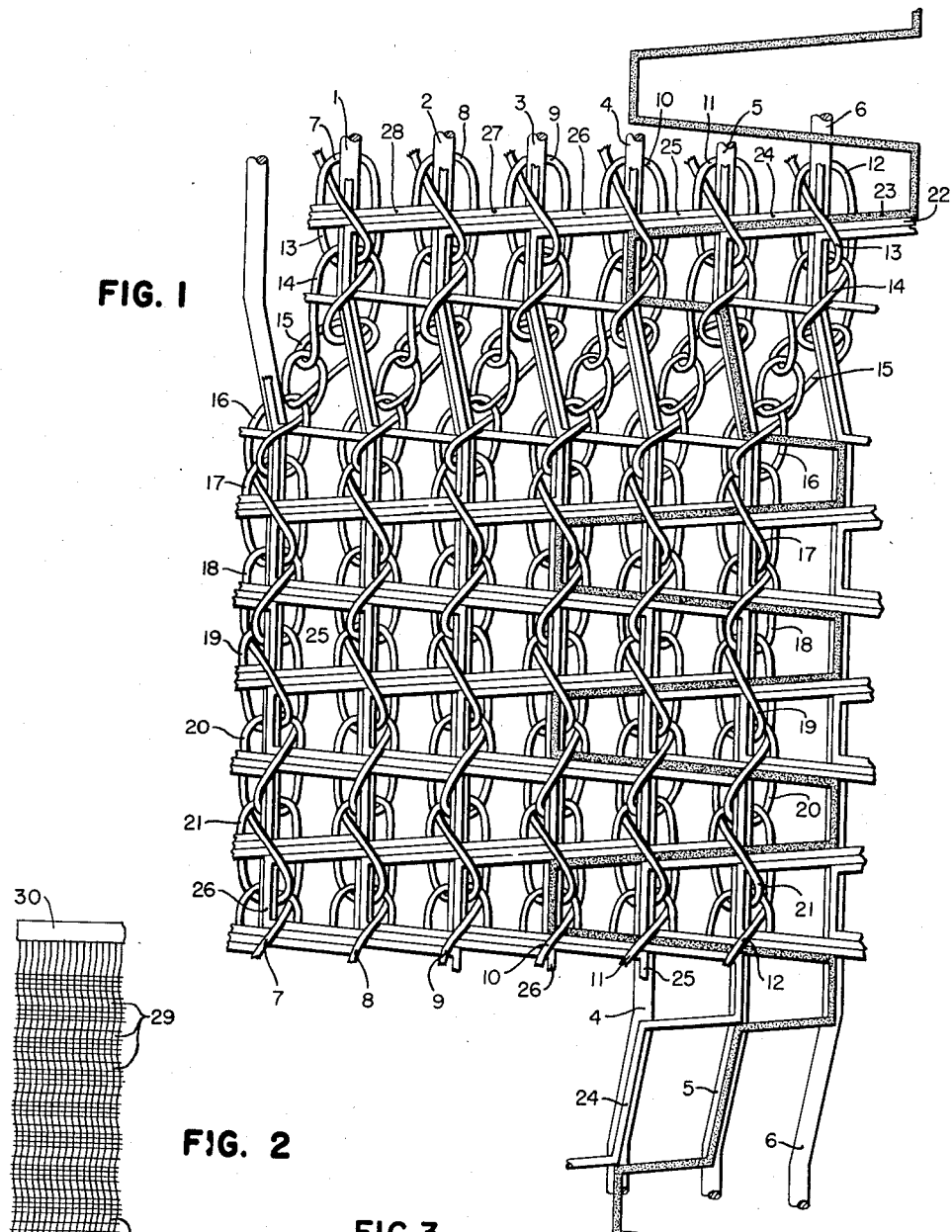
Fig. 1 represents a diagrammatic view showing the details of construction of one form of the invention.

In Fig. 1, one typical form of knitted fabric incorporating the resistance wires 1, 2, 3, 4, 5 and 6 therein is illustrated. The knitted fabric illustrated is a modified conventional warp knit fabric in which the wales 7, 8, 9, 10, 11 and 12 of the fabric are formed of textile cord and extend substantially longitudinally or warpwise of the fabric with the adjacent loops of each wale forming generally transversely extending courses 13, 14, 15, 16, 17, 18, 19, 20 and 21. As is true in any knitted fabric, the wales themselves are independent and separate but are held together by transversely extending weft elements 22, 23, 24, 25, 26, 27 and 28 extending across in one direction in a course of several of the wales, then back across in an adjacent course.

As shown, each weft cord passes through the loops of the knitted wale stitches in a course of four successive adjacent wales to tie them together. A typical weft cord 24, for example, passes through the loops in course 20 of wales 9, 10, 11 and 12 and then weft cord 24 then moves to the next course 19 and then moves across the fabric in the reverse direction and through the loops of the next course 19 of the same four wales 9, 10, 11 and 12. The adjacent weft cord 25 similarly passes through the loops of the knitted stitches in course 20 of each of four adjacent wales 8, 9, 10 and 11 resulting in the extent of weft cord 25 being offset transversely one wale from the first mentioned weft cord 24. This is repeated across the width of the fabric to provide a continuous interlock of the wales with each loop of the wale having four weft cords lying therein so that the wefts of the completed fabric lie in tandem and parallel arrangement across each course of the fabric. As a result, each loop of each wale stitch in the finished fabric includes portions of four weft cords within the loop.

The modifications made to the conventional knit structure shown in Fig. 1, comprise the incorporation of the resistance wires 1, 2, 3, 4, 5 and 6 extending longitudinally of the fabric and passing through the loops of the wales 7, 8, 9, 10, 11 and 12. The wires are laid in the fabric, that is they are not knitted but held in the fabric by the other elements making up the fabric structure. As a result, each wire extends in a generally warp-wise direction and parallel to the other wires in much the same manner as stuffer elements in a woven fabric, and the term "stuffer elements" as used herein is meant to refer to the laid in wire elements which are not knitted so as to form a part of the knitted fabric. In other words, the wires could be left out of the knitted fabric yet the fabric would be a complete and integral fabric. At spaced intervals along the warp direction each wire is moved to the adjacent wale so as to pass through the loops of the adjacent wale for a predetermined number of courses. As the wires move to the adjacent wale, the weft elements also move transversely over one wale in the opposite direction as the wires. In the particular fabric illustrated in Fig. 1 the moving of the wire from one wale to another then back produces a fabric in which the wires assume a sinuous shape when the fabric is completed, and the overall appearance of a finished fabric is that of a fabric with sinuously extending parallel wires throughout the length. The knitted fabric when the knitting structure is drawn down during the knitting operation compromises the forces due to the tension of the wire so that the wire absorbs a portion of the tension and the knitted wales absorb the remaining portion of the tension. As a result, the final fabric structure also shows a slight sinuosity in the wale path. As this transverse movement takes place, the wires are not laid in a course 15 of the knitted fabric and simultaneously the weft elements are not knitted into the loops of the wale elements. Of course, the knitting of the wale elements is continued but at that particular course the wales do not have the weft elements running therethrough as is shown in Fig. 1. This is evident in the finished fabric and is indicated in Fig. 2 by the numeral 29.

Numerous combinations of warp knitted structures of this type may be made by variations in the knitting machine operation, such as the number of wales and the number of courses in each wale which the wires pass through before changing. In the particular structure illustrated, each wire moves over one wale in the same course for eight courses then returns to the original wale for eight courses. This means that the knitted structure repeats itself every sixteen courses in the particular fabric illustrated in Fig. 1. If greater flexibility is required, the knitting pattern of the fabric may be changed so that the wire moves transversely across three or more wales successively before returning to the original wale. The number of courses in each wale may be varied to increase or decrease the amount of sinuosity according to the requirements of the particular heating element.

Figure 2:
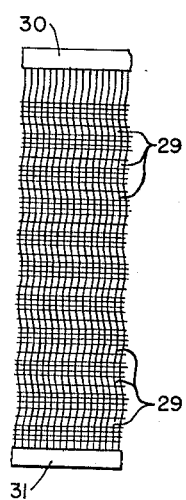
Fig. 2 is a schematic view of a portion of the resistance heating element made in accordance with the teachings of the invention.
Figure 3:
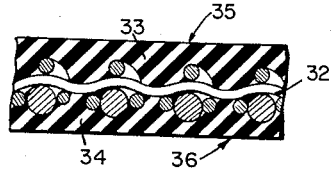
Fig. 3 is a cross-sectional view of a portion of a heating element using the applicants' invention.

The finished fabric, after it leaves the knitting machine, has substantially the appearance as seen in Fig. 2. The knitted stitches are drawn together so that the closely spaced resistance wires extend sinuously and parallel therethrough. The sinuosity of the wires clearly appears in the finished fabric. As the various knitting stitches draw together after knitting, the forces caused by the resilience of the wire and knitted wales are in a state of equilibrium resulting in a portion of the distortion or sinuosity being assumed by the wale stitch as well as the wire. The distortion of the wire and wale stitch is seen in Fig. 1 at the points where the wires are transferred to the adjacent wales.

It is apparent that many different types of materials may be used to produce the electric resistance heating elements. As is typical of knitted fabrics, the wales provide a substantial part of the strength of the knitted structure and preferably should be formed of one of the materials having relatively high tensile strength such as nylon, Dacron, cotton, rayon or other similar materials. These cords also must be relatively ductile so as not to break due to the severe flexing in the knitting operation. The weft elements may be of materials similar to those suitable for the wales but also may be of the relative brittle materials such as glass fibre because the weft elements are substantially unflexed and undeformed during or after the knitting operation.

The resistance wires may be of round, oval, flat or any other desired cross section and either of solid or stranded construction. The particular selection of wire material will be dependent upon the specific heat requirements of the structure and may be, for example, Nichrome or the various nickel-copper resistance materials which are well known in the art. Preferably stranded wires are used with adjacent wires having opposite twists to prevent curling of the knitted structure.

A typical electric resistance heating element acceptable as a de-icer for an airfoil surface includes wales of nylon cords, weft elements of glass fibre cords and the resistance wires of Nichrome stranded wires of alternate right and left hand twists.

To fabricate the heating element, the ends of the wires are connected in groups to conductors 30 and 31 which in turn are attached to a source of electrical power. The particular combinations of wire grouping and the particular type of electrical circuit may be varied to meet the required conditions as is well known in the art. Subsequent to the circuit connections, the fabricated unit 32 is then embedded or sandwiched between insulating layers 33 and 34 of non-conductive material such as rubber to protect the heating element and form the exposed surface or surfaces 35 and 36 thereof. The assembly is then vulcanized under heat and pressure to form an integral structure. During vulcanization, the rubber flows around the resistance wires to assure that the wires will be completely insulated from each other even when the element is subjected to distortion during use or installation.

While certain representative embodiments and details have been shown for the purpose of illustrating the invention, it will be apparent to those skilled in the art that various changes and modifications may be made therein without departing from the spirit or scope of the invention.

Having thus fully described our invention, what we desire to secure by Letters Patent of the United States is:

1. An electrical resistance heating element comprising a warp knitted fabric having a plurality of spaced unknitted electrical resistance wires extending generally in the warp direction throughout the length of the fabric and held within the wales of said fabric, each wire along its length thereof extending sinuously back and forth between a plurality of adjacent wales of the knitted fabric with the wires having substantially identical aligned sinuous patterns and means to connect said wires to a source of electric current.

2. An electrical resistance heating unit comprising a warp knitted fabric having a plurality of substantially parallel, spaced unknitted resistance elements incorporated therein during the knitting operation and extending generally in the warp direction throughout the length of the fabric and held within the wales thereof, each resistance element along the length thereof extending sinuously back and forth between a plurality of adjacent wales of the knitted fabric with each resistance element having a substantially identical sinuous pattern and being aligned with each of other said elements and means to attach said resistance elements to a source of electric current.

3. A warp knitted fabric electrical resistance heating element comprising a plurality of warp extending unknitted resistance wires therein held within the wales of said fabric with the wires being in spaced relation and extending back and forth between a plurality of adjacent wales of said fabric to form a sinuous path for the reach of each wire through said fabric, said paths for the wires being substantially identical and aligned and means to connect the ends of each wire to a source of electric current, the wires being electrically insulated from each other throughout their length.

4. A warp knitted fabric electrical resistance heating element comprising a plurality of warp extending unknitted resistance wires therein held within the wales of said fabric, with the wires being in spaced relation and extending between the wales of said fabric, the reach of each wire extending sinuously back and forth between two or more wales of said fabric with each reach having a substantially identical pattern and being aligned with each of other said reaches, and means to connect the ends of each wire to a source of electric current, the wires being electrically insulated from each other throughout their reaches.

5. An anti-icing covering for aircraft surfaces having an electrical heating unit contained therein comprising a warp knitted fabric having a plurality of spaced unknitted electrical resistance elements extending generally in a warp direction and held within the wales of said fabric, each element along its length thereof extending sinuously back and forth between a plurality of wales of the knitted fabric with each element having a substantially identical pattern and being aligned with each of other said elements and having means to connect the ends of each element to a source of electric current; a layer of elastic rubber-like material on one side of said heating unit adapted to be attached to said aircraft surface; and a second layer of elastic rubber-like material on the other side of said heating unit to form the exposed surface of the covering, the heating unit and layers of rubber-like material being bonded together to form an integral flexible structure that may be adapted to the contour of the aircraft surface.

6. A flexible electric heater comprising a warp knitted fabric, a plurality of spaced unknitted electrical resistance elements in said fabric, each element extending in the warp direction and held within the wales of said fabric in a sinuous path between at least two of the adjacent wales of said fabric with said resistance elements having substantially identical aligned sinuous paths, means to connect said elements to a source of electric current, and a layer of elastic rubber-like insulating material encasing the fabric and elements therein to form a unitary insulated structure.

7. A warp knitted fabric for use in an electrical heating element which comprises a plurality of generally parallel knitted wales and a plurality of generally parallel unknitted electrical resistance stuffer wires held within the wales of said fabric, successive portions of said wires lying in adjacent wales and said wires being held in a substantially aligned identical generally sinuous form by said wales.

8. A warp knitted fabric for use in an electrical heating device which comprises a plurality of generally parallel knitted wales and a plurality of generally parallel unknitted electrical resistance stuffer elements extending in the same general direction as said wales and held therein, said stuffer elements extending back and forth between at least two of said wales and having successive portions of said stuffer elements lying in adjacent wales and in substantially aligned identical sinuous paths.

9. A warp knitted fabric for use in an electric heating element device which comprises a plurality of generally parallel knitted wales, a plurality of generally parallel unknitted electrical resistance stuffer elements extending in the same general direction as said wales and held therein, and a plurality of weft members extending through similar courses of said wales, said stuffer elements extending back and forth between at least two of said wales and having successive portions of said stuffer elements lying in adjacent wales and in substantially aligned identical sinuous paths.

10. A fabric as claimed in claim 9 in which said stuffer elements are twisted wires with adjacent wires being twisted in opposite directions.

References Cited in the file of this patent
UNITED STATES PATENTS

| | | |
|---|---|---|
| 2,372,673 | Jacob | Apr. 3, 1945 |
| 2,392,470 | Fitzmaurice | Jan. 8, 1946 |
| 2,396,099 | Hartwell | Mar. 5, 1946 |
| 2,458,801 | Schwartz | Jan. 11, 1949 |
| 2,670,620 | Goldstaub | Mar. 2, 1954 |